United States Patent [19]

Paufler

[11] 4,169,610
[45] Oct. 2, 1979

[54] TRAILER ALIGNMENT DEVICE

[76] Inventor: Frederick J. Paufler, 3334 Badger, S.W., Wyoming, Mich. 49509

[21] Appl. No.: 883,892

[22] Filed: Mar. 6, 1978

[51] Int. Cl.² ............................................. B60D 1/06
[52] U.S. Cl. .................................................. 280/477
[58] Field of Search ........................... 280/477; 33/264; 248/226.2

[56] References Cited

U.S. PATENT DOCUMENTS

| | | | |
|---|---|---|---|
| 2,815,732 | 12/1957 | Majors | 280/477 |
| 2,984,011 | 5/1961 | Hamilton | 280/477 |
| 3,015,162 | 1/1962 | Bohnet | 280/477 |
| 3,111,296 | 11/1963 | Ludes | 248/226.2 |
| 3,702,029 | 11/1972 | Anderson | 33/246 AS |
| 3,720,000 | 3/1973 | Schlegel | 33/264 |
| 3,765,703 | 8/1973 | Voelkerding | 280/477 |
| 3,774,149 | 11/1973 | Bennett | 340/52 R |
| 3,818,599 | 6/1974 | Tague | 280/477 |
| 3,867,898 | 2/1975 | Lakamp | 116/28 R |
| 3,889,384 | 6/1975 | White | 280/477 |
| 3,918,746 | 11/1975 | Lehtisaari | 280/477 |
| 3,966,231 | 6/1976 | Metzler | 280/477 |
| 4,012,056 | 3/1977 | Christensen | 280/477 |

*Primary Examiner*—Joseph F. Peters, Jr.
*Assistant Examiner*—R. Schrecengost
*Attorney, Agent, or Firm*—Price, Heneveld, Huizenga & Cooper

[57] ABSTRACT

A trailer alignment device includes a pair of clamps one provided for each of a ball hitch mounted to a vehicle and a trailer hitch on a vehicle to be towed. Each clamp includes arms for supporting a collapsible vertically extendable rod such that the rods are aligned directly over the ball and hitch respectively. A sighting chain is provided at the end of each rod to assure vertical orientation of the rod. Such structure permits the clamps to be readily attached so that a vehicle can be backed into alignment with a trailer with the ball in alignment under the corresponding hitch when the pair of vertical rods contact one another.

10 Claims, 6 Drawing Figures

TRAILER ALIGNMENT DEVICE

BACKGROUND OF THE INVENTION

The present invention relates to improvements in trailer alignment devices.

The task of backing a vehicle with a ball hitch into alignment with a trailer or other vehicle to be towed can be, and frequently is, a frustrating experience for the driver. Typically, the hitch either is not positioned in side-to-side alignment with the trailer or the vehicle is too close or too far away from the trailer when the driver goes back to hitch the vehicles together.

In order to facilitate alignment of a pair of vehicles for hitching together, several devices have been proposed by which vertically extending rods are provided with one rod positioned on the ball of the towing vehicle and the other rod on the hitch of the towed vehicle. The vehicle operator can then, by looking through the rearview mirror, ascertain when the respective hitch portions are in alignment by the alignment of the rods. Representative of such prior art is U.S. Pat. Nos. 2,815,732 issued Dec. 10, 1957 to J. C. Majors; 3,015,162 issued Jan. 2, 1962 to H. C. Bohnet; 3,702,029 issued Nov. 7, 1972 to H. Anderson, Jr.; and 3,818,599 issued June 25, 1974 to R. J. Tague.

Although the prior art recognizes to some extent the desirability of providing a collapsible vertical rod which permits greater portability of such alignment devices, as well as recognizing the desirability of providing vertical alignment of the ball and hitch by having rods come into contact when such alignment is achieved, the apparatus of the prior art does not assure that these desirable end results can be readily accomplished. Accordingly, there remains a need for a trailer alignment device which can be easily attached to insure the desired alignment in a fail safe manner and yet be collapsible to form a relatively small portable package since during use frequently a trailer will be hitched and unhitched many times and it is desired to carry the alignment devices in the vehicles without using excessive space.

SUMMARY OF THE INVENTION

The present invention provides a pair of trailer alignment devices in which a clamp is provided for attachment to a hitch and includes means for supporting a rod for extension vertically. A freely hanging alignment member extends under the rod permitting vertical alignment of the rod by sight. In one embodiment of the invention, the rods are mounted on a freely floating arm to assure centering of the vertical rod over the respective hitch element. In other embodiments of the invention, arm means for the clamp is formed of a plurality of foldable sections to provide a compact device for storing.

These and other features, objects, and advantages of the present invention can best be understood by reference to the following description thereof, together with the drawings in which:

DETAILED DESCRIPTION OF THE PREFERRED EMBODIMENT

Figure 1:
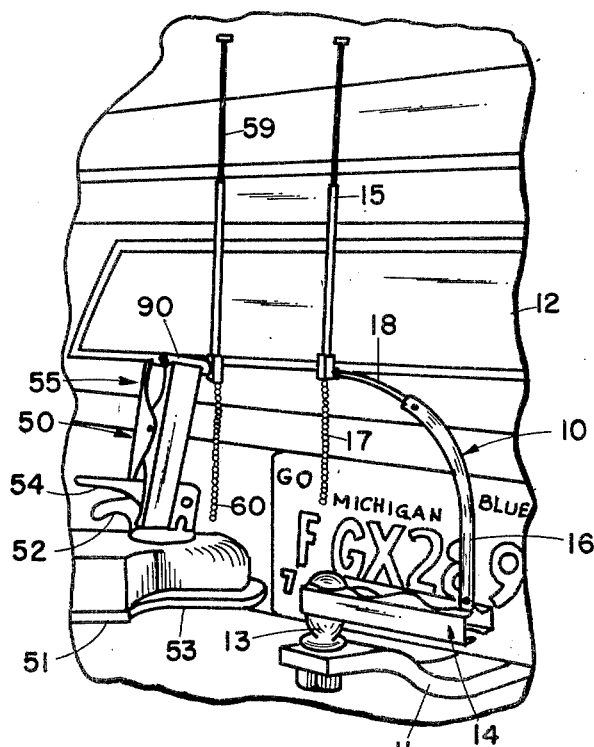
FIG. 1 is a fragmentary perspective view of the apparatus of the present invention shown attached to a pair of vehicles to be hitched.

Referring initially to FIG. 1 there is shown a trailer alignment device of the present invention by which a first alignment device 10 is installed on a towing vehicle 12 such as an automobile and a second alignment device 50 is installed on the hitch of a towed device such as a trailer. Vehicle 12 may, for example, be an automobile, truck, or the like with a towing bar 11 extending rearwardly from the back end and having mounted thereon in a conventional manner a standard ball hitch 13. The towed vehicle may be a travel trailer, utility trailer, or any other type of vehicle to be towed and includes a tongue 51 with a standard ball hitch 53 for receiving ball 13 of the towing vehicle. As is conventional, such trailer hitches include a locking handle 54 and a release arm 52.

As seen in FIG. 1, the alignment device 10 includes a clamping member 14 having jaws at one end which is spring loaded and includes jaws which surround and clamp to ball 13. At the opposite end of the clamping member is an articulated compound arm including sections 16 and 18. Means are provided for mounting arm 16 to clamp 14 and an extensible and retractable rod 15 to the end of arm 18. Further, freely hanging alignment means 17 are provided for assuring vertical alignment of rod 15 directly over the center of ball 13.

Also, as seen with respect to FIG. 1, device 50 includes a spring loaded clamp 55 with jaws which fit over locking handle 54. Arm means 90 are provided for supporting a collapsible and extensible vertically extending rod 59. Freely hanging alignment means 60 are secured to the end of rod 59 for assuring vertical alignment of rod 59 directly over the center of hitch 53. Having briefly described the overall structure, a detailed description of the separate alignment devices is now presented beginning with device 10 as shown in detail in the exploded view of FIG. 3.

Alignment device 10 includes a clamp 14 having identical jaw members 20 and 22 which are cut and formed from galvanized sheet metal. Each includes a side wall 21 and upper and lower flanges 23 and 25, respectively. The flanges are configurated at the ball clamping end by annular shaped recesses 26 to provide generally semi-circular clamping edges or jaws which circumscribe a portion of the circular ball 13 at vertically spaced locations to provide secure clamping to the ball. A center projection 28 on each of the upper and lower flanges 23 and 25 includes apertures 29 therethrough for receiving a bolt 30 defining the pivot point for the opening or closing of jaw members 20 and 22. Thus, apertures 29 in each of the halves are in alignment with bolt 30 passing through apertures 29 and a spacing ferrule 32 and secured by means of a lock washer 33 and nut 34. In order to hold the jaws in a bias closed position, a tension spring 36 is provided and secured by means of clips 37 and 38 which fit over the end coil of the spring 36 at opposite ends and is secured to the clamps 20 and 22 by means of sheet metal screws 39 and 40' extending through apertures 41 formed in side walls 21 of the jaw members. Spring 36 is a tension spring of sufficient tensil strength to securely hold the jaw members in a closed position. The jaws are opened by a pivoting about bolt 30 when a compressive force is applied to the ends 27 defining handles for the jaw members.

The rod holding arm means for the alignment device is secured to the clamp 14 by means of a floating arm section 40 comprising a galvanized formed sheet metal member having a floor 41' through which aperture 42 is provided for attachment to the clamps by placing the floor under ferrule 32 and passing bolt 30 through aperture 42 before securing it with nut 34. Arm 40 includes at the forward end an upwardly extending tab 44 which is spaced to fit between two coils of spring 36 for centering the floating arm with respect to the jaws of clamp 14. At the rear end of arm 40 there is provided an upwardly extending mounting bracket 46 comprising a pair of legs upwardly formed from the edges of the arm and through which there is provided at aperture 45 for attachment of end 48 of the first articulated arm 16.

Figure 3:
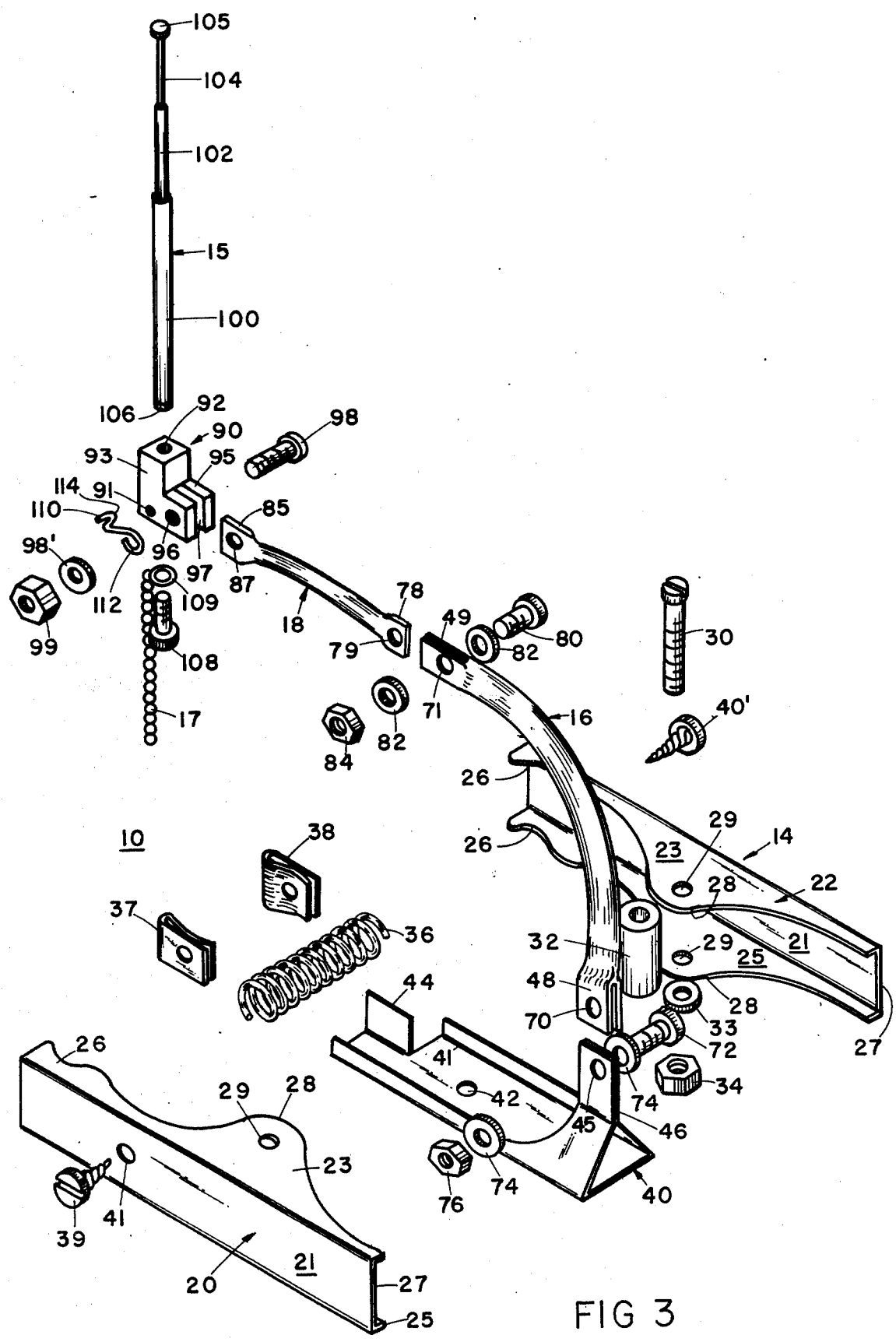
FIG. 3 is an enlarged exploded perspective view of the device shown in FIG. 2.

Arm 16 comprises a generally 60° curved tube having flattened ends 48 and 49 through which there is provided apertures 70 and 71, respectively. End 48 is secured to mounting bracket 46 by means of bolt 72, washers 74, and nut 76 secured to permit the arm to be folded and pivoted about bolt 72. As seen in FIG. 3, the end 48 can be formed by flattening the circular tube forming arm 16 and slotting the arm such that a pair of flanges are provided which overlie the mounting bracket 46. End 49 can be similarly fabricated. Arm 16 can be curved any desirable amount from approximately 60° to 90° to provide the desired foldability and compactness of the unit.

Pivotally attached to end 49 of arm 16 is end 78 of arm 18 also formed of a slightly curved piece of tubing having end 78 flattened and an aperture 79 drilled therethrough for receiving an attaching bolt 80 together with washer 82 and nut 84 which pivotally attach arm 18 to the end of arm 16. The opposite end 85 of arm 18 includes an aperture 87 therethrough for pivotally securing this end of the arm to rod mounting means 90.

Mounting means 90 in the preferred embodiment of the invention comprises a generally L-shaped block of polymeric material such as plexiglass or other material which has a slightly lubracious quality and includes a central longitudinally extending aperture 92 for slidably receiving the lower section 100 of the collapsible rod 15. Aperture 92 extends through the vertically extending leg 93 of the L-shaped block 90 while the remaining leg 95 includes a slot 97 with a transverse aperture 96 extending therethrough. Slot 97 is adapted to receive end 85 of arm 18 and is pivotally secured thereto by means of bolt 98, washer 98', and nut 99. Block 90 also includes an aperture 91 formed through leg 93 and communicating with one side wall of aperture 92. A spring biased keeper pin 110 has a loop 112 at one end which is secured to bolt 98 to project locking tab 114 into aperture 91 and against the bottom section 100 of collapsible rod 15. This locks the rod in a fixed position although permitting the rod to be moved with sufficient pressure.

Rod 15 comprises as best seen in FIG. 3 a standard commercially available multi-sectioned antenna including a base section 100, an intermediate section 102, and an upper section 104 with a ball 105 at the top. Naturally the rod may include a greater or fewer number of sections so long as it extends upwardly a sufficient distance to be seen through the rear window of the vehicle once installed as shown in FIG. 1.

Rod 15 also includes fitted within the lower end of section 100 a threaded nut 106 for receiving screw 108 to which a freely hanging chain 17 is secured by means of loop 109 integral with the chain. Chain 17 is the type conventionally employed for pull chain light switches and is of sufficient length to permit alignment of the antenna collapsible rod 15 as described below. Other relatively small link chains could be employed. Also, line or string with a weight at the end remote from rod 15 could be employed. Instead of attaching the chain directly to the end of rod 15 where screw 108 also serves as a stop preventing removal of the rod from block 90, it could be attached to the block immediately adjacent aperture 92.

Figure 2:
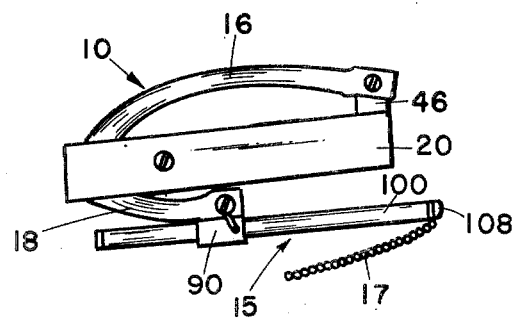
FIG. 2 is an elevational view of the alignment device for the towing vehicle shown in a folded position for storage.

As seen in FIG. 2, once the unit is assembled it can be collapsed with the junction of rods 16 and 18 held between the jaws of clamp 14 and section 100 of collapsible rod 15 roughly centered within block 90 to provide a relatively compact package for storage.

Figure 4:
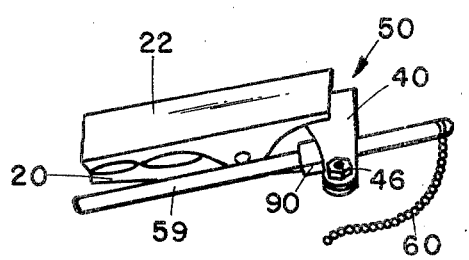
FIG. 4 is a perspective view of the device used on the towed vehicle as shown in FIG. 1 and shown in a folded position for storage.

The second alignment device 50 (FIGS. 1 and 4) employed for use on the towed vehicle such as a trailer is of substantially identical construction with the exception of the arms attaching rod 59 to the clamp. Thus, clamp 50 includes a pair of jaw members 20 and 22 and a floating arm 40 and substantially identical mechanical components coupling the jaw members and floating arm in substantially the same manner as shown in FIG. 3 for device 10. The collapsible rod 59 is attached to arm 40 only by block 90 which is of the same construction as block 90 shown in FIG. 3. The block is pivotally secured directly to the mounting bracket 46 of arm 40. This simplified construction is possible since clamp 50 can be positioned on handle 54 sufficiently close to the trailer hitch 53 so that rod 59 can be vertically aligned therewith. As seen in FIG. 4, the alignment device 50 also is compactly stored by sliding the collapsible rod 59 within block 90 to form the package shown.

In operation, clamp 14 is first placed on ball 13 and arms 16 and 18 articulated with the rod 15 extended to a height sufficient to be seen through the rear windows generally in the position shown in FIG. 1. The arms 16 and 18 and/or clamp 14 on ball 13 are then adjusted while sighting down rod 15 until the freely hanging chain 17 which serves as a plum line is in alignment with rod 15 and its end is generally centered above ball 13 as shown. Similarly, the device 50 is clamped to handle 54 and with rod 59 fully extended, it is adjusted by pivoting block 90 with respect to mounting bracket 46 until such time as the end of chain 60 is directly above the ball receiving socket of the trailer hitch and rod 59 is in alignment with the freely hanging chain 60. Such mounting which is relatively accomplished assures that the alignment rods 15 and 59 are vertically oriented directly above the respective hitch points. As seen in FIG. 1, the trailer tongue is typically elevated sufficiently above ball 13 in this position such that the vehicle can be backed with the leading portion of the hitch being able to extend directly above ball 13 by virtue of the vertical clearance provided by arms 16 and 18 of the device. Thus, the vehicle is backed until the rods 15 and 59 come into contact with one another which can be viewed through the rearview mirror of the vehicle. When in this position, the socket of the trailer hitch will be directly above and aligned with the ball 13 regardless of the angle of attack between the vehicle and the trailer. Thus, by the present invention there is provided a readily mountable and alignable system which virtually assures accurate positioning of a trailer hitch with respect to the ball or if other types of hitches are employed similar alignment of the hitching devices.

Figure 5:
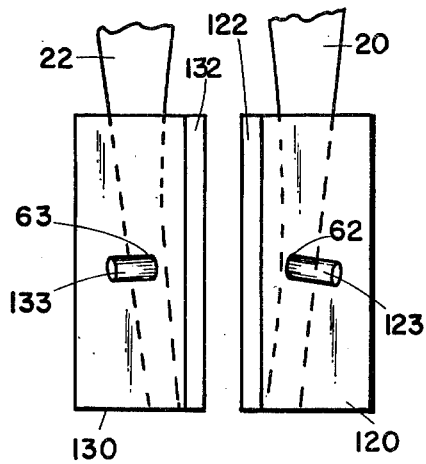
FIG. 5 is an enlarged fragmentary side elevational view of a modification to the structure shown in FIG. 4.

Clamp 50 may, instead of jaws which are substantially similar to those of clamp 14, employ a set of cushioned pivotal jaws as shown and described with respect to FIG. 5. Referring to FIG. 5, the ends of jaw members 20 and 22 have apertures 62 and 63, respectively, drilled through the flanges of the generally U-shaped clamps for receiving U-shaped sheet metal pads 120 and 130, respectively. Pads 120, 130 have a length sufficient to cover the vertical height of handle 54 of most trailer hitches and are of U-shaped cross section with the open part of the U facing the outside of the jaws. On the facing base surfaces of the U-shaped members 120 and 130 there is provided resilient pads 122 and 132, respectively, which can be attached by a suitable bonding adhesive to assure a non-slip grip between the clamp and the locking handle for the trailer hitch. Members 120, 130 are pivotally mounted to the clamp by means of rods 123 and 133 which extend through apertures of the U-shaped members and apertures 62 and 63 formed through the clamp. The apertures through the legs of the clamps and members 120 and 130 are positioned to permit the jaws so formed to rotate about the pins 123 and 133 and thereby align as necessary on the handle 54 which can present an irregular surface for the clamps.

Figure 6:
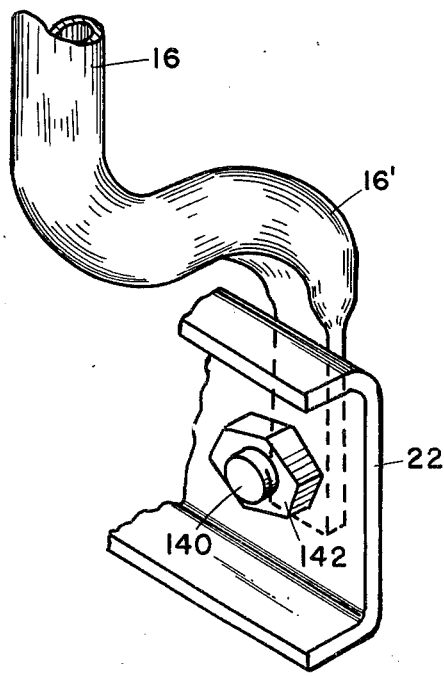
FIG. 6 is an enlarged fragmentary perspective view of an alternative embodiment of the devices shown in FIG. 1.

Although the floating arm arrangement as best seen in FIG. 3 provides centering of the rods with respect to the hitch members, in some embodiments it may be desirable to simplify the attachment of the arm 16 to the clamp 14. FIG. 6 illustrates an alternative embodiment whereby one leg 22 of either of clamps 14 or 50 has the rod 16 (or block 90, respectively) secured directly to the end of the clamp by means of a bolt 140 and nut 142. In this embodiment, the rod 16 is bent inwardly at 16' as required for centering the vertically extending rod 15 above the hitch ball. In some embodiments, it may be desirable to dip coat the jaws of the clamp with PVC to provide better gripping to the hitch members.

It will become apparent to those skilled in the art that various other modifications to the preferred embodiment of the invention disclosed and described herein can be made without departing from the spirit or scope of the invention as defined by the appended claims.

The embodiments of the invention in which an exclusive property or privilege is claimed are defined as follows:

1. A vehicle alignment device for aligning the hitch of a towing vehicle to that of a towed vehicle in which one such device is used on each of the vehicles, said alignment device comprising:
   clamp means for attachment to a vehicle hitch;
   a vertically extendible rod;
   means for adjustably coupling said rod to said clamp means for orienting said rod in a generally vertical direction comprising at least one arm pivotally coupled to said clamp means and including means for slidably holding said rod permitting compact storage of said alignment device; and
   freely hanging alignment means extending from a lower end of said vertically extendible rod permitting visual alignment of said rod in a vertical direction by aligning said rod with said alignment means.

2. The apparatus as defined in claim 1 wherein said clamp means comprises a pair of jaw members with jaws shaped to engage a vehicle hitch and means biasing said jaw members in a jaw closed position.

3. The apparatus as defined in claim 2 wherein said jaws of each jaw member comprises a pair of spaced concavely curved edges for attachment of said clamp means to a ball hitch.

4. The apparatus as defined in claim 2 wherein said jaws of each of said jaw member includes a gripping member pivotally coupled to said jaw member.

5. The apparatus as defined in claim 2 wherein said means for adjustably coupling said rod to said clamp means includes a plurality of arms pivotally coupled to one another and to said clamp means such that said rod can be positioned above a hitch member with clearance thereunder and said device can be compactly folded for storage.

6. The apparatus as defined in claim 5 and further including a floating arm coupled between said jaw members and to said biasing means for centering said floating arm between said arm members, said floating arm including means for mounting an end of one of said plurality of arms thereto.

7. The apparatus as defined in claim 1 wherein said alignment means comprises a chain.

8. Vehicle alignment apparatus for demountable attachment to vehicles for facilitating the hitching of vehicles together comprising:
   clamp means for attachment of the alignment device to a vehicle, said clamp means including a pair of jaw members each having a jaw at one end, means for pivotally coupling said jaw members together for movement between jaw open and jaw closed positions, and bias means coupled to said jaw members for holding them in a jaw closed position;
   a collapsible rod; and
   arm means, including means for slidably holding said collapsible rod thereto, pivotally coupled to said clamp means for adjusting said collapsible rod to a vertically oriented position wherein said slidable holding means comprises a block having a first aperture extending therethrough for passage of said collapsible rod in said block, said block including a second aperture communicating with said first aperture and a keeper spring coupled to said block and including a portion extending into said second aperture and in contact with said collapsible rod to hold said rod in a stationary position.

9. The apparatus as defined in claim 8 and further including freely hanging alignment means extending from a lower end of said collapsible rod permitting visual alignment of said rod in a vertical direction by aligning said rod with said alignment means.

10. The apparatus as defined in claim 9 wherein said alignment means comprises a chain.

* * * * *